United States Patent [19]

Patel

[11] Patent Number: 5,135,661
[45] Date of Patent: Aug. 4, 1992

[54] PROCESS FOR TREATING WATER OR AQUEOUS SYSTEMS

[76] Inventor: Suresh Patel, 37 Lawnswood Park Road, Swinton, Manchester M27 1NJ, England

[21] Appl. No.: 725,381

[22] Filed: Jun. 27, 1991

Related U.S. Application Data

[62] Division of Ser. No. 494,193, Mar. 15, 1990, abandoned.

[30] Foreign Application Priority Data

Mar. 21, 1989 [GB] United Kingdom ............... 8906413

[51] Int. Cl.$^5$ .............................................. C02F 5/10
[52] U.S. Cl. ..................... 210/698; 252/180
[58] Field of Search ................... 210/698-701; 252/82, 180

[56] References Cited

U.S. PATENT DOCUMENTS

| | | | |
|---|---|---|---|
| 3,810,834 | 5/1974 | Jones et al. | 210/698 |
| 4,085,060 | 4/1978 | Vassileff | 252/189 |
| 4,086,146 | 4/1978 | Block | 203/7 |
| 4,200,500 | 4/1980 | Desai | 203/7 |
| 4,640,793 | 2/1987 | Persinski | 210/698 |
| 4,698,161 | 10/1987 | Hansen | 210/698 |
| 4,704,208 | 11/1987 | Bouet | 210/698 |
| 4,740,314 | 4/1988 | Kneller | 210/701 |
| 4,925,568 | 5/1990 | Morse | 210/701 |
| 4,973,409 | 11/1990 | Cook | 210/701 |

FOREIGN PATENT DOCUMENTS

| | | |
|---|---|---|
| WO8704696 | 8/1987 | PCT Int'l Appl. |
| 1414918 | 11/1975 | United Kingdom |
| 1433221 | 4/1976 | United Kingdom |
| 2110659 | 6/1983 | United Kingdom |
| 2173183 | 10/1986 | United Kingdom |
| 2181735 | 4/1987 | United Kingdom |

Primary Examiner—Peter Hruskoci
Attorney, Agent, or Firm—Luther A. R. Hall

[57] ABSTRACT

The present invention provides a process for treating water or an aqueous system to prevent the deposition of scale caused by scale-forming impurities in the water which comprises hydrolyzed polymaleic anhydride and a hydrolyzed copolymer of maleic anhydride with at least one mono-ethylenically unsaturated monomer.

2 Claims, 6 Drawing Sheets

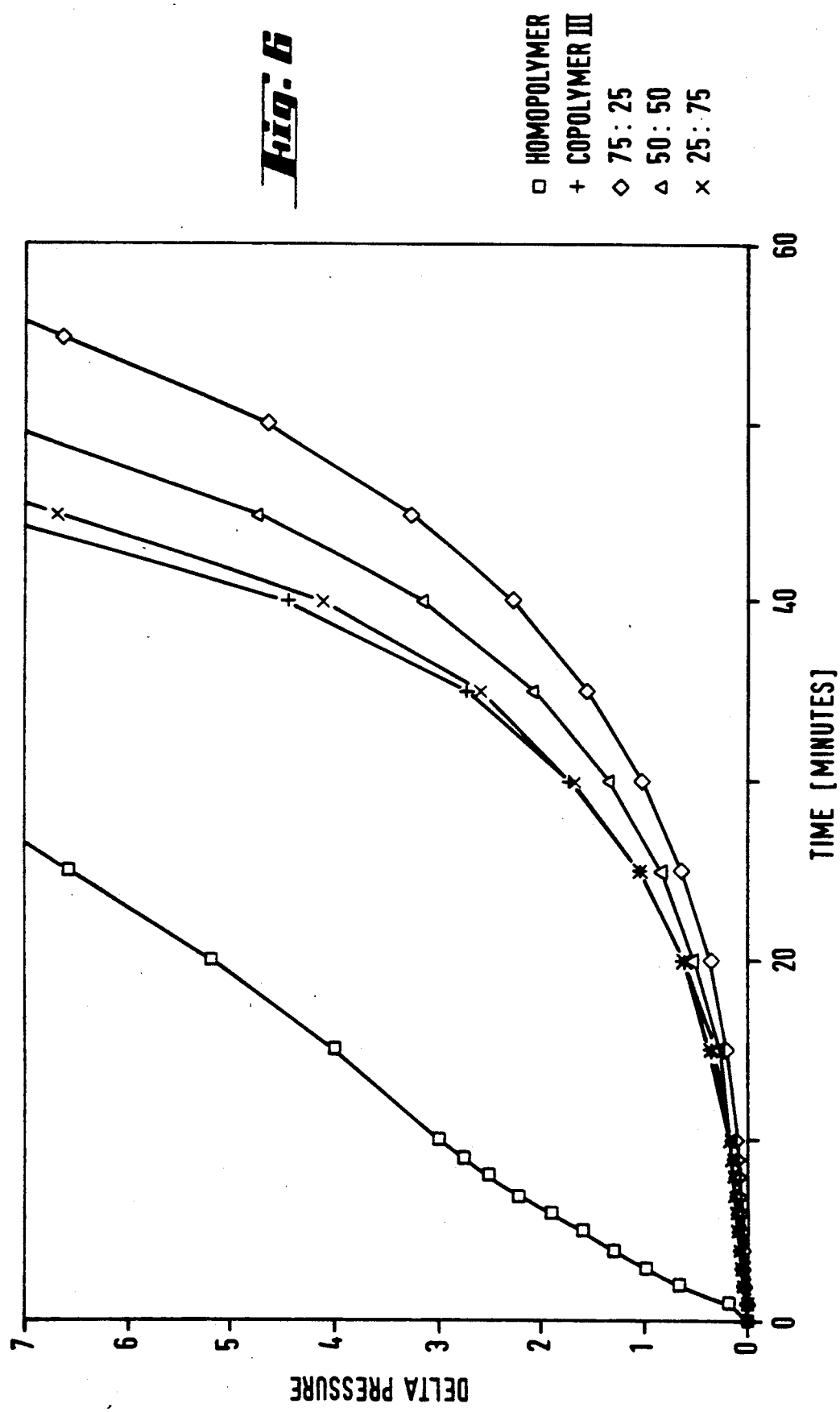

PROCESS FOR TREATING WATER OR AQUEOUS SYSTEMS

This is a division of application Ser. No. 494,193, filed on Mar. 15, 1990, now abandoned.

The present invention relates to a method of treating water or an aqueous system in order to prevent or minimise the formation of calcium and magnesium salt deposits on the surfaces of pipes, boilers, evaporators, steam ejectors and the like.

Numerous additives have been proposed for addition to water or aqueous systems for these purposes including certain polyphosphates, polycarboxylic acids such as polyacrylic acid and polymethacrylic acid, hydrolysed polymaleic anhydride and hydrolysed copolymers of maleic anhydride with other ethylenically unsaturated monomers.

GB 1414918 describes a process for treating water to prevent the deposition of scale which comprises adding to the water a hydrolysed copolymer of maleic anhydride with one or more monoethylenically unsaturated monomers, the copolymer having a molar ratio of maleic anhydride to other monomers between 2.5:1 and 100:1. It is suggested in GB 1414918 that the copolymer may be used in combination with other water treatment compounds, a list of numerous known dispersing an/or threshold agents being given, including polymaleic acid and its salts. The only specific combination mentioned in GB 1414918 is that of the copolymer and a napthalenesulphonic acid-formaldehyde condensation product.

We have now surprisingly found that if hydrolysed polymaleic anhydride is used in admixture with a hydrolysed copolymer of maleic anhydride with one or more other ethylenically unsaturated monomers, a synergistic effect is obtained. The synergistic effect is particularly marked with respect to threshold properties where the homopolymer has a weight average molecular weight of 400 to 800. Maleic anhydride homopolymers conventionally used in commercial water treatment processes have had higher molecular weights.

Accordingly the present invention provides a composition for treating water or an aqueous system to prevent the deposition of scale caused by scale-forming impurities in the water which comprises hydrolysed polymaleic anhydride and a hydrolysed copolymer of maleic anhydride with at least one mono-ethylenically unsaturated monomer.

The hydrolysed homopolymer and the hydrolysed copolymer may have weight average molecular weights up to 5000. The hydrolysed homopolymer preferably has a weight average molecular weight of up to 1000, especially 400 to 800. The hydrolysed copolymer preferably has a weight average molecular weight from 400 to 3000, especially 800 to 2500.

Suitable copolymers include copolymers of maleic anhydride with at least one monomer selected from a mono-ethylenicaly unsaturated acid, or an ester, anhydride, amide or water-soluble thereof, a mono-ethylenically unsaturated hydrocarbon, nitrile, aldehyde or ketone or a vinyl carboxylate; and mixtures of two or more of said copolymers.

The ethylenically unsaturated monomers may be selected from a wide variety of compounds, for example acrylic acid, methacrylic acid, crotonic acid, itaconic acid, aconitic acid, itaconic anhydride, ethyl acrylate, methyl methacrylate, acrylonitrile, acrylamide, vinyl acetate, styrene, alpha-methyl styrene, vinyl sulphonic acid, 2-acrylamido-2-methylpropane sulphonic acid, methyl vinyl ketone, acrolein, ethylene, propylene or mixtures thereof.

Preferably the monomer copolymerised with maleic anhydride is at least one monomer selected from an unsaturated monocarboxylic acid, such as acrylic acid or methacrylic acid; a $C_1$-$C_8$ alkyl ester of an unsaturated monocarboxylic acid, such as methyl acrylate, ethyl acrylate, isopropyl acrylate, n-butyl acrylate, 2-ethylhexyl acrylate and the corresponding methacrylate; an amide of an unsaturated monocarboxylic acid such as acrylamide or methacrylamide; an unsaturated sulphonic acid such as vinylsulphonic acid, allylsulphonic acid or a styrenesulphonic acid, or an alkali metal salt thereof; an unsaturated nitrile such as acrylonitrile or methacrylonitrile; a vinyl ester of a $C_1$-$C_8$ monocarboxylic acid such as vinyl acetate, vinyl propionate or vinyl butyrate; or a styrene such as styrene itself, alpha-methylstyrene or p-methylstyrene.

In a preferred embodiment of the invention, the copolymer is a copolymer of maleic anhydride with vinyl acetate, a copolymer of maleic anhydride with ethyl acrylate, a copolymer of maleic anhydride with vinyl acetate and ethyl acrylate, a copolymer of maleic anhydride with allylsulphonic acid or an alkali metal salt thereof, a copolymer of maleic anhydride with acrylonitrile or a mixture of two or more of such copolymers.

When mixtures of monomers are used, the resulting polymer may be, for example, a terpolymer derived from maleic anhydride and two other monomers. Such terpolymer are, for example those derived from maleic anhydride with two ethylenically unsaturated monomers, selected from acrylic acid, methacrylic acid, crotonic acid, itaconic acid, aconitic acid, ethyl acrylate, methyl methacrylate an other esters of said acids, acrylonitrile, acrylamide, vinyl acetate, styrene, alpha-methylstyrene, methyl vinyl ketone, acrolein, ethylene and propylene, the molar ratio of said two ethylenically unsaturated monomers to each other being from 1:3 to 3:1.

Preferred hydrolysed terpolymers include a hydrolysed terpolymer of maleic anhydride with (a) vinyl acetate and other ethylenically unsaturated monomer selected from the group consisting of ethyl acrylate, acrylamide, methyl vinyl ketone, acrylonitrile and crotonic acid, wherein the molar ratio of vinyl acetate to the other monomer is 1:3 to 3:1; or with (b) a 1:1 molar ratio of methyl methacrylate and ethyl acrylate; or with (c) a 1:1 molar ratio of methyl acrylate and acrolein.

In an especially preferred embodiment of the invention the copolymer is a hydrolysed terpolymer of maleic anhydride with vinyl acetate and ethyl acrylate, the molar ratio of maleic anhydride to the combined moles of vinyl acetate and ethyl acrylate being from 2.5:1 to 5:1, the molar ratio of vinyl acetate to ethyl acrylate being 1:3 to 3:1, preferably 1:2 to 2:1.

The hydrolysed homopolymers and copolymers used in the compositions of the invention are known and may be produced as described in, for example, GB 1369429 and GB 1414918. Hydrolysis of the homopolymer and copolymer may be effected using water or dilute acid or alkali, so the hydrolysed polymaleic anhydride and the hydrolysed copolymer may each be present as an acid or an alkali metal salt thereof.

The weight ratio of hydrolysed polymaleic anhydride to the hydrolysed copolymer is not critical as a synergistic effect is generally obtained at most proportions.

Good results are generally obtained with such a weight ratio between 10:90 and 90:10 a weight ratio from 25:75 to 75:25 being preferred. Within those limits the optimum ratio may vary according to the nature of the copolymer and the amount of composition added to the water. For instance, ratios of 25:75, 50:50 and 75:25 can be used successfully.

The amount of composition used to treat the water may be from 0.1 to 100 ppm, preferably from 0.5 to 20 ppm.

The compositions of the invention are useful for inhibiting the deposition of scale forming compounds from water or aqueous systems.

When used to inhibit the deposition of scale and the precipitation of salts from aqueous solutions, the compositions of the invention, in the form of acids or salts thereof, are particularly effective in inhibiting deposition of scale-forming salts derived from calcium, magnesium, barium or strontium cations, and anions such as sulphate, carbonate, hydroxide, phosphate and silicate.

With respect to aqueous systems which may be treated according to the present invention, of particular interest are cooling water systems, steam generating systems, sea-water evaporators, reverse osmosis equipment, bottle washing plants, pulp and paper manufacturing equipment, sugar evaporator equipment, soil irrigation systems, hydrostatic cookers, gas scrubbing systems, closed circuit heating systems, aqueous-based refrigeration systems and oil production and drilling systems.

The compositions of the invention may be used alone, or in conjunction with other compounds known to be useful in the treatment of aqueous systems.

In the treatment of systems such as cooling water systems, air-conditioning systems, steam-generating systems, sea-water evaporator systems, hydrostatic cookers, and closed circuit heating or refrigerant systems, corrosion inhibitors may be used such as, for example, water soluble zinc salts; phosphates; polyphosphates; phosphonic acids and their salts, for example, hydroxyethyl diphosphonic acid (HEDP), nitrilotris methylene phosphonic acid and methylamino dimethylene phosphonocarboxylic acids and their salts, for example, those described in German Offenlegungsschrift 2632774, hydroxyphosphonoacetic acid, 2-phosphonobutane-1,2,4-tri-carboxylic acid and those disclosed in GB 1572406; nitrates, for example, sodium nitrate, nitrites, e.g. sodium nitrite; molybdates, e.g., sodium molybdate, tungstates; silicates, e.g. sodium silicate; benzotriazole, bis-benzotriazole or copper deactivating benzotriazole or tolutriazole derivatives or their Mannich base derivatives; mercaptobenzotriazole; N-acyl sarcosines; N-acylimino diacetic acids; ethanolamines; fatty amines; polyacrylic acid, and alkali metal salts thereof, copolymers of acrylic acid, e.g. copolymers of acrylic acid and hydroxyalkylated acrylic acid, and substituted derivatives of polyacrylic acids and their copolymers. Moreover, in such systems, the compositions used according to the invention may be used in conjunction with further dispersing and/or threshold agents, e.g. polymerised acrylic acid (or its salts), phosphino-polycarboxylic acids (as described and claimed in British Patent 1452835), the cotelomeric compounds described in European Patent Application No. 0150706, hydrolysed polyacrylonitrile, polymerised methacrylic acid and its salts, polyacrylamide and copolymers thereof from acrylic and methacrylic acids, lignin sulphonic acid and its salts, tannin, naphthalene sulphonic acid/formaldehyde condensation products, starch and its derivatives, cellulose, acrylic acid/lower alkyl hydroxy-acrylate copolymers, e.g. those described in U.S. Pat. No. 4,029,577, sulfonated styrene homopolymers, e.g. those described in U.S. Pat. No. 4,374,733 and combinations thereof. Specific threshold agents, such as for example, 2-phosphonobutane-1,2,4-tri-carboxylic acid (PBSAM), hydroxyethyl diphosphonic acid (HEDP), alkyl phosphonic acids, hydroxyphosphonoacetic acid, 1-aminoalkyl-1,1,-diphosphonic acids and their salts, and alkali metal polyphosphates, may also be used.

Particularly interesting additive packages are those comprising compositions of the invention with one or more of polyacrylic acid or copolymers thereof, or substituted copolymers, hydroxyphosphonoacetic acid, HEDP, PBSAM, triazoles such as tolutriazole, molybdates and nitrites.

Precipitating agents such as alkali metal orthophosphates, carbonates; oxygen scavengers such as alkali metal sulphites and hydrazines; sequestering agents such as nitrilotriacetic acid and its salts; antifoaming agents such as silicones, e.g. polydimethylsiloxanes, distearylsebacamide, distearyl adipamide and related products derived from ethylene oxide and/or propylene oxide condensations, in addition to fatty alcohols, such as capryl alcohols and their ethylene oxide condensates; and biocides, e.g. amines, quaternary ammonium compounds, chlorophenols, sulphur-containing compounds such as sulphones, methylene bis thiocyanates and carbamates, isothiazolones, brominated propionamides, triazines, phosphonium compounds, chlorine and chlorine-release agents, bromine and bromine-releasing agents and organometallic compounds such as tributyl tin oxide, may be used together with compositions of the invention.

BRIEF DESCRIPTION OF THE DRAWINGS

FIGS. 1–6 are graphs of the test results produced by the instant Examples.

The invention is illustrated by the following Examples.

In the Examples, the Homopolymer is a hydrolysed polymaleic anhydride, prepared in xylene as solvent, having a weight average molecular weight of 580; Copolymer I is a terpolymer from maleic anhydride, ethyl acrylate and vinyl acetate in a molar ratio of 6:1:1 prepared in xylene as solvent and having a weight average molecular weight of 850; Copolymer II is a hydrolysed copolymer of maleic anhydride and acrylonitrile; and Copolymer III is a hydrolysed 1:1 copolymer of maleic anhydride and allylsulphonic acid (as the sodium salt) having a molecular weight of 2200.

EXAMPLE 1

Compositions of the invention are made by mixing the Homopolymer and Copolymer I in ratios by weight of 25:75, 50:50 and 75:25. These compositions are tested using amounts of 05., 1.0, 1.5, 2.0, 2.5, 3.0, 4.0 and 5.0 ppm, as well as the same amounts of the Homopolymer and copolymer separately, in the following way.

The ability of the products in preventing the deposition of calcium carbonate under seeded growth conditions is measured by mixing together solutions containing the respective cations and anions to give a solution which precipitates under the conditions specified. The products are added to the cation solution before mixing. After a certain period of time the concentration of the cation left in solution is measured and the % inhibition of precipitation (I %) is calculated using the formula:

$$I\% = \frac{C\,\text{final} - C\,\text{blank}}{C\,\text{initial} - C\,\text{blank}} \times 100$$

where

Figure 1:
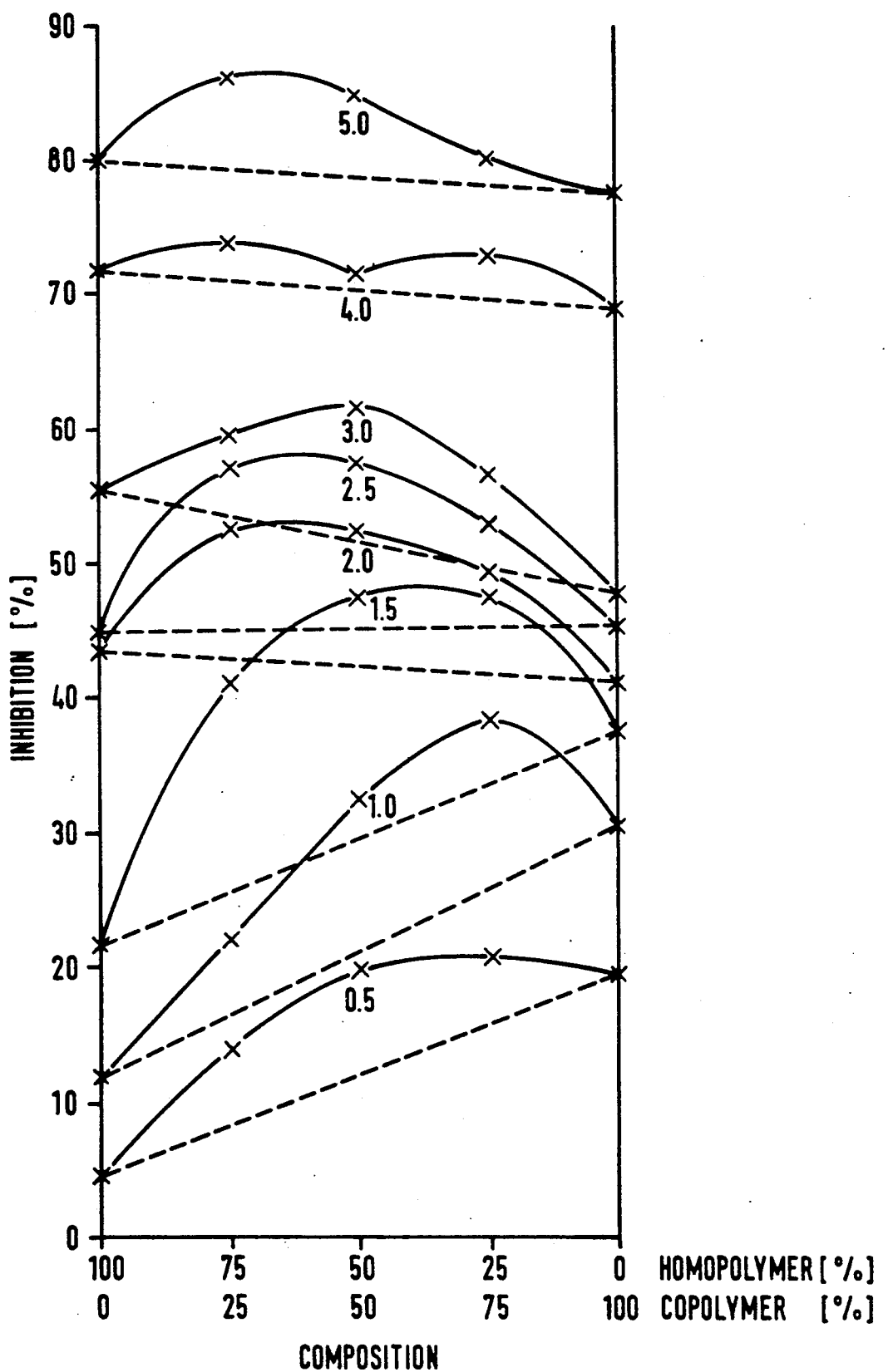

C final = cation concentration at end of test
C initial = cation concentration at start of test
C blank = cation concentration at end of test in absence of an inhibitor The test solution contains 125 ml/l $Ca^{2+}$, 375 mg/l $Mg^{2+}$, 182 mg/l $CO_3^{2-}$ and the inhibitor. Each test solution contains 0.02 g dry calcium carbonate seeds. The test solution is conducted for 30 minutes at 85° C. and the level of $Ca^{2+}$ ions in solution measured. The results obtained are shown in FIG. 1 of the accompanying drawings, where the dotted lines represent expected results if the effect of the two components is purely additive and the continuous lines show the results obtained, showing synergy as the % inhibition is greater than expected.

EXAMPLE 2

A tube blocking test is used to compare the scale control performance of the Homopolymer, Copolymer I and compositions of the invention containing both under aqueous conditions. The inhibitor under test is mixed with a synthetic seawater which is prepared from the following two solutions:

Solution 1

40 g/liter NaCl
3.08 g/liter $CaCl_2 2H_2O$
22.2 g/liter $MgCl_2 6H_2O$
1.6 g/liter KCl
8.25 g/liter $Na_2SO_4$ Solution 2

3.06 g/liter NaCl
0.69 g/liter $NaCO_3$

Figure 2:
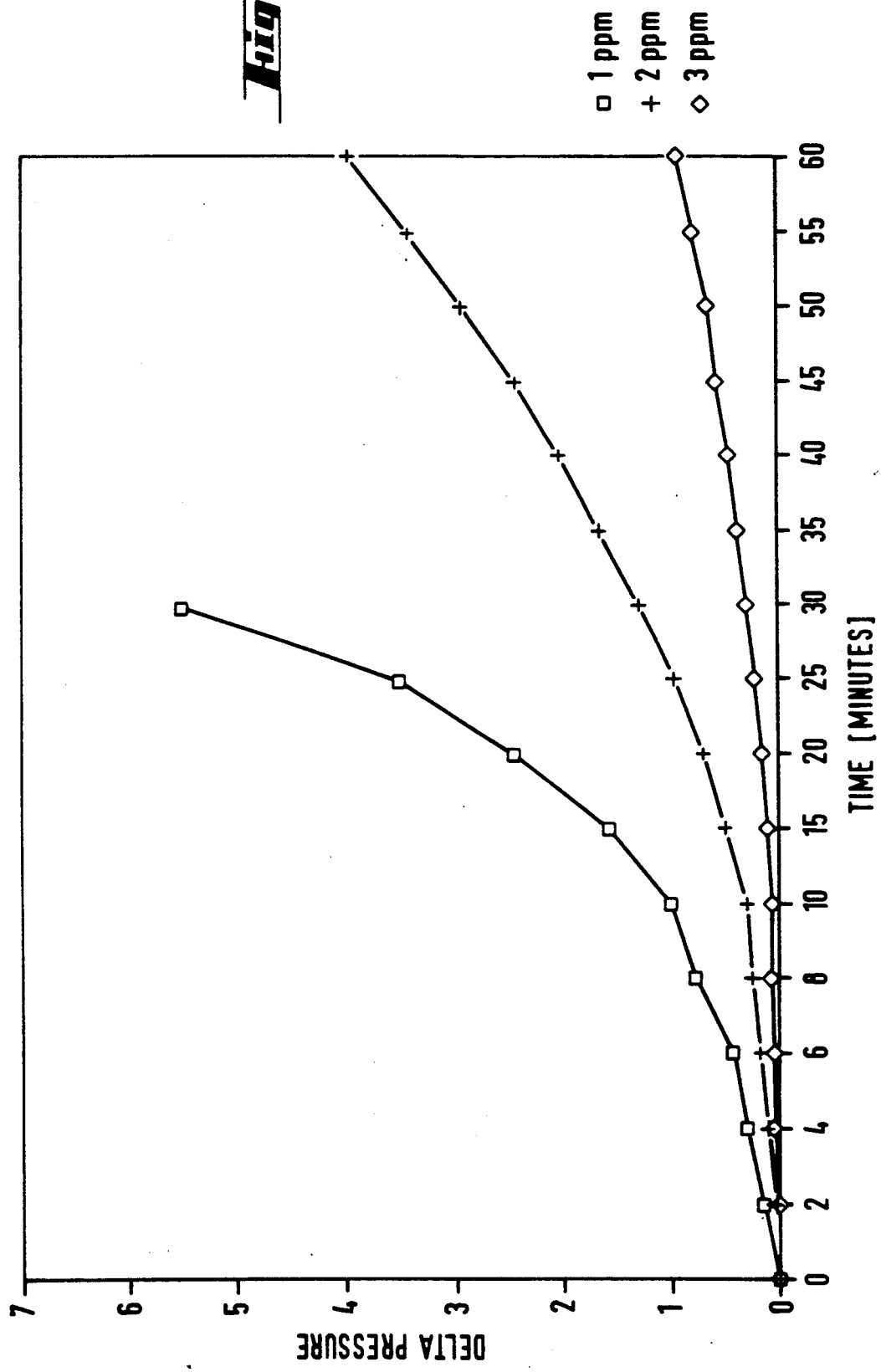
Figure 3:
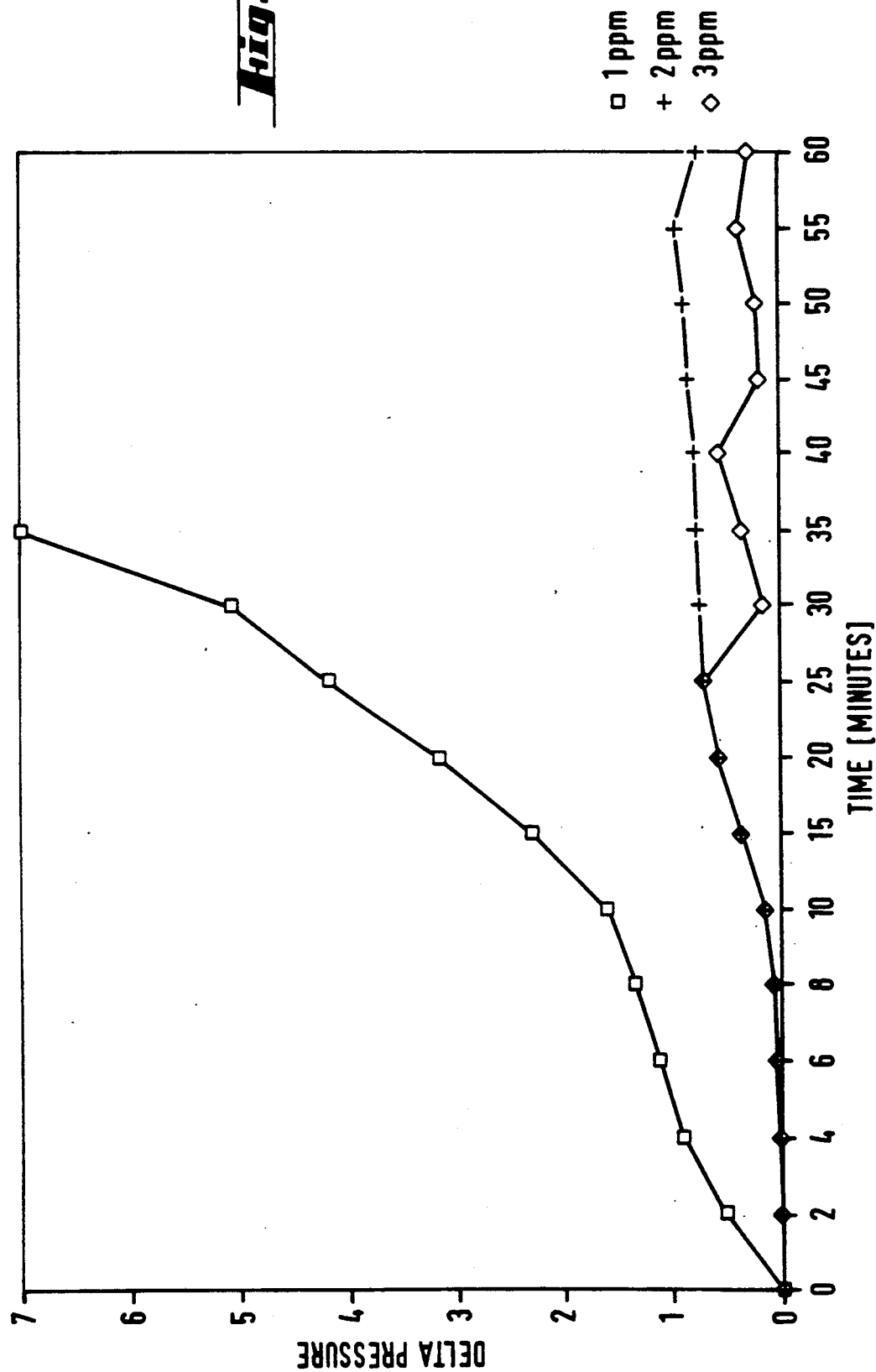
Figure 4:
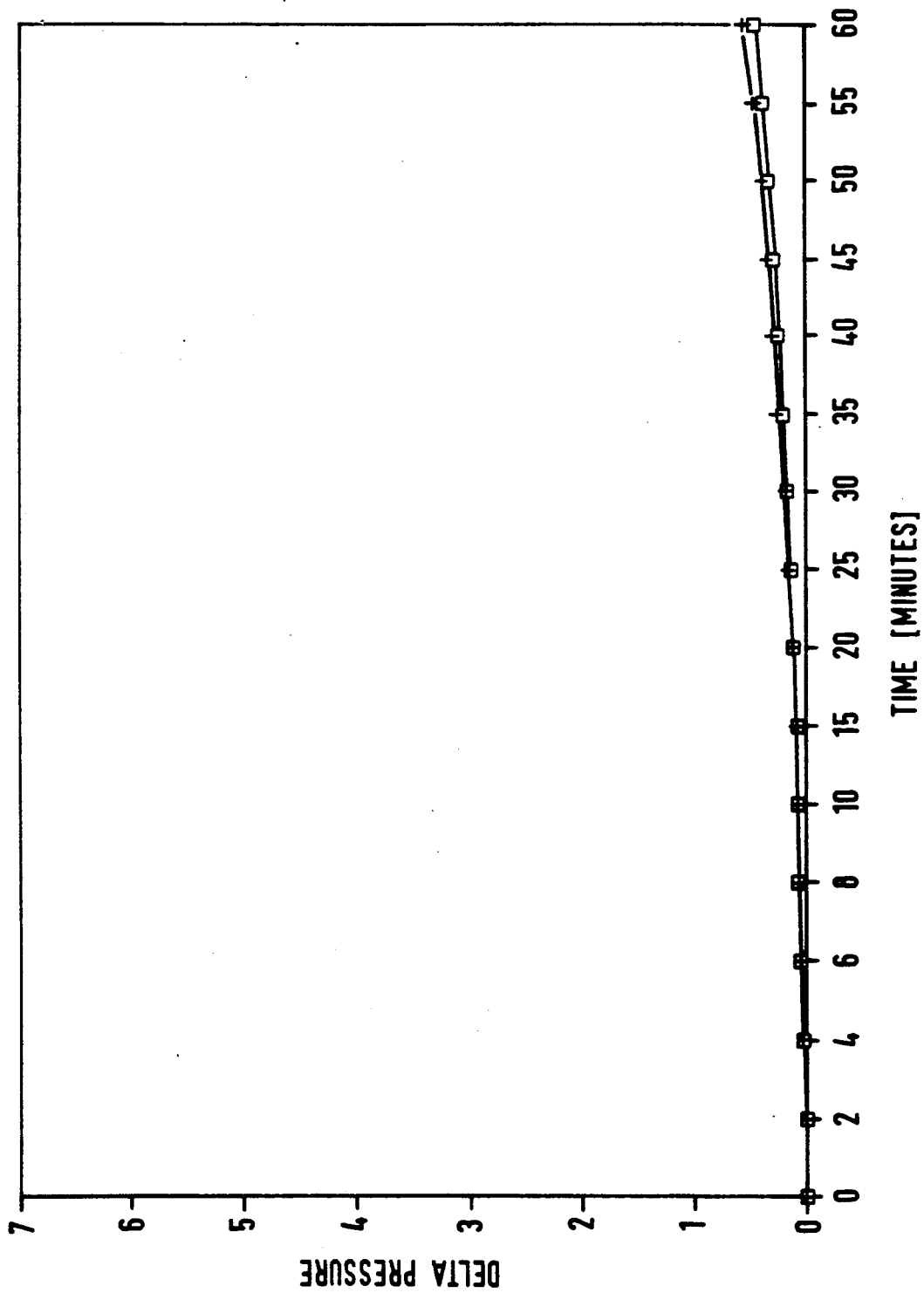

The resultant solution is pumped through a cupronickel coil, 1 meter in length and 1.1 mm internal diameter, which is immersed in a water bath at 90° C. The deposition of scale inside the tube results in an increase in the velocity of the fluid and an increase in pressure. The change in pressure across the tube is monitored using a ceramic pressure sensor inside a pressure measurement and control unit. The resulting change in pressure is shown in FIG. 2, 3 and 4. FIG. 2 shows the change (delta pressure) for the Homopolymer at 1,2 and 3 ppm; and FIG. 3 shows the change for Copolymer I at 1,2 and 3 ppm; and FIG. 4 shows the change for compositions of the invention at 2 ppm and ratios of homopolymer to copolymer of 25:75 and 50:50. The results for the compositions of the invention are better than those for the homopolymer or copolymer even when these are used at 3 ppm.

EXAMPLE 3

Figure 5:
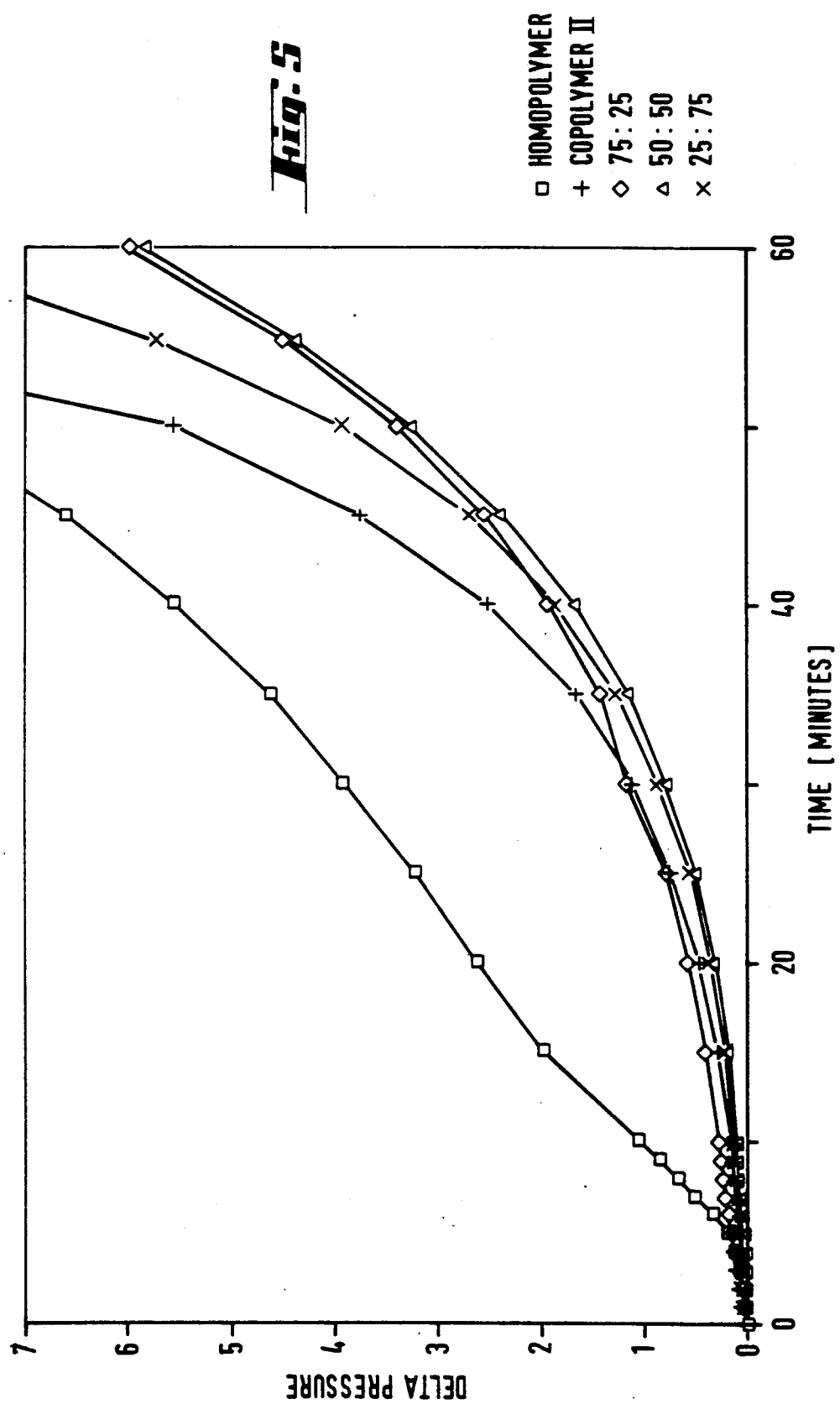

The test procedure of Example 2 is repeated to compare the scale control performance, at 1 ppm addition, of the Homopolymer, Copolymer II and compositions of the invention containing mixtures of the homopolymer and the copolymer. The results are shown in FIG. 5, where the curve with points marked with the square symbol shows the change (delta pressure) for the homopolymer, the curve with points marked + shows the change for the copolymer, the curve with points marked with diamonds shows the change for a homopolymer:copolymer weight ratio of 75:25, the curve marked with triangles shows the change for a weight ratio of 50:50 and the curve marked with x shows the change for a homopolymer:copolymer weight ratio of 25:75. The synergistic effect obtained with compositions of the invention is evident from these curves.

EXAMPLE 4:

The test procedure of Example 2 is repeated to compare the scale control performance, at 1 ppm addition, of the Homopolymer, Copolymer III and compositions of the invention containing mixtures of the homopolymer and copolymer. The results are shown in FIG. 6, where the curve with points marked with the square symbol shows the change (delta pressure) for the homopolymer, the curve with points marked + shows the change for the copolymer, the curve with points marked with diamonds shows the change for a homopolymer, the curve with points marked with diamonds shows the change for a homopolymer:copolymer weight ratio of 75:25, the curve marked with triangles shows the change for a weight ratio of 50:50 and the curve marked with x shows the change for a homopolymer:copolymer weight ratio of 25:75. The synergistic effect obtained with compositions of the invention is evident from these curves.

I claim:

1. A process of treating water or an aqueous system to inhibit the deposition of calcium carbonate scale caused by scale-forming impurities in the water or aqueous system, which comprises
   adding to the water or aqueous system 0.1 to 100 ppm of a composition comprising
   (a) hydrolyzed polymaleic anhydride having a weight average molecular weight of 400 to 800, and
   (b) a hydrolyzed copolymer having a weight average molecular weight of 800 to 2500 which is a terpolymer of maleic anhydride with vinyl acetate and ethyl acrylate, the molar ratio of maleic anhydride to the combined moles of vinyl acetate and ethyl acrylate being from 2.5:1 to 5:1, the molar ratio of vinyl acetate to ethyl acrylate being from 1:3 to 3:1; and in which the hydrolyzed polymaleic anhydride and hydrolyzed copolymer are in a ratio by weight of from 25:75 to 75:25.

2. A process according to claim 1 in which the amount of said composition added is from 0.5 to 20 ppm.

* * * * *